United States Patent [19]

Oncken et al.

[11] Patent Number: 4,725,719

[45] Date of Patent: Feb. 16, 1988

[54] RESTRICTED PURPOSE, COMMERCIAL, MONETARY REGULATION METHOD

[75] Inventors: John E. Oncken; Edward N. Piner; Margaret L. Roach, all of Austin, Tex.

[73] Assignee: First City National Bank of Austin, Austin, Tex.

[21] Appl. No.: 887,524

[22] Filed: Jul. 21, 1986

[51] Int. Cl.⁴ ............................................. G06K 19/00
[52] U.S. Cl. .................................... 235/487; 235/381
[58] Field of Search ................................ 235/381, 487

[56] References Cited

U.S. PATENT DOCUMENTS 3,697,729 10/1972 Edwards ............................ 235/381

*Primary Examiner*—Harold I. Pitts
*Attorney, Agent, or Firm*—John Nevin Shaffer, Jr.

[57] ABSTRACT

A restricted purpose, commercial, monetary regulation method is provided whereby a network is established between the business user, the acceptor of the restricted purpose card and a financial institution so that the business user obtains a unique identification number that enables him to purchase only one specific product or service from the acceptor. As a result, employers are free to give this card to employees without endangering the employees by entrusting them with large sums of cash or currency and while also ensuring any use of the card will be for a purpose authorized by the business. Once the validity of the card is authenticated, the transaction is completed by the acceptor, the information is transferred to financial institution and the funds are transferred from the user's account to the acceptor's account. An audit trail is provided by the assignment of a unique transaction number to each transaction and statements are provided to the user and the acceptor detailing the specifics of each transaction over a period of time.

8 Claims, 4 Drawing Figures

RESTRICTED PURPOSE, COMMERCIAL, MONETARY REGULATION METHOD

BACKGROUND OF THE INVENTION

This invention relates to a means for providing a restricted purpose, commercial monetary regulation method.

Systems for regulation of commercial transactions on the basis of pre-established criteria have existed for some time. The utilization of credit cards, debit cards and individual department store credit cards in lieu of cash payment is an ever increasing phenomenon. Along with the increase in utilization of these cash substitutes, however, abuse of these cards by authorized and unauthorized individuals has necessitated the development of a wide variety of methods designed to identify and prevent card abuse. Examples of various means utilized to prevent card abuse include arbitrary selection of various credit cards presented to an examining device for selection for inquiry as to ownership and validity as disclosed in Goldman, U.S. Pat. No. 3,566,081 and Goldman, U.S. Pat. No. 3,891,830 wherein a credit card verification system is utilized with credit cards that contain information such as credit limits, the number of transactions within a certain period of time and a comparison of whether or not any credit still remains within the prescribed limits. Yet another method for preventing the unauthorized use of cards is disclosed in Basset et al., U.S. Pat. No. 4,439,670, wherein the card of that invention collects information on the number of inaccurate attempts to enter a confidential code for use of the card and, once the number of unauthorized attempts reaches a predetermined value, the device energizes a control circuit which disables the card.

Manufacturers of cards have utilized various other means and methods to limit unauthorized use of cards such as limiting the period of time within which the credit card is valid. Nothing about this method, however, prevents authorized or unauthorized use of the card within or even above maximum limits over a short period of time.

Other protective means have been established by the acceptors of cards such as "floor limits" which are adopted so that any credit card transaction above a certain limit would require authentication and authorization. This system clearly does not prevent authorized or unauthorized use below the floor limit nor is the system universally adopted so that an unauthorized credit card holder can simply go to another store with higher or no limits and still use the card.

As can be seen from the above discussion, existing devices and methods for preventing unauthorized use of cards are ineffective and/or cumbersome in that expensive electronic screening equipment is required or modification of credit cards by providing sophisticated internal micro processing means are required to effect a still non perfect solution. An understanding of the problem is facilitated by reviewing the various types of cards currently in use as well as other payment methods that are currently available.

National and international credit cards such as Master Card and Visa are issued primarily to consumers based upon the credit worthiness of the consumer card holder. These cards are almost universally accepted for the purchase of almost any product or service. Additionally, purchases can be initiated by phone. Purchases can also be electronically authorized and captured, recorded, for payment from a prepared statement forwarded at a later date to the card holder.

Department store credit cards are issued by major national retailers, such as Sears, on the same basis as national credit cards. That is, cards are issued to consumers based on the credit worthiness of the card holder. Also, like national cards, department store cards may be used to purchase any product or service offered by the retailer in their stores or catalogs. Also, purchases may be initiated by phone and payment is made to the retailer as a byproduct of the operation of the credit card portion of the retailer's business when customers are later billed for their purchases.

Gasoline credit cards operate in much the same manner as department store credit cards and are issued by major oil companies to both consumer and commercial customers, once again, based upon the credit worthiness of the applicant. Similarly, these cards are utilized to purchase a wide variety of products and services from oil company outlets world wide. Payment to the oil company results from the collection process related to the operation of the credit card portion of their business wherein a bill is sent to the credit card user for payment at a later date.

"Fleet" cards are issued to businesses by financial institutions for the purpose of purchasing gasoline and/or maintenance services for vehicles owned by the company at service stations that have agreed to accept the Fleet card for payment. The financial institution pays the service providers and charges an account of the cardholder business maintained at the financial institution for that purpose. The card must be presented in person and an identification code provided by the individual purchasing goods or services to initiate payment. A variety of goods and services may be purchased at any service provider that displays the Fleet card emblem.

A relatively new innovation in cards is a debit card issued by financial institutions to retail customers to allow electronic access to customer's accounts with the financial institution. Cards may be used to obtain cash and conduct other financial transactions through automatic teller machines. Additionally, these cards may be used to purchase goods and services at businesses that participate in point of sale networks with specific financial institutions. These purchases are limited to "in store" purchases due to the necessity to activate the card by use of a confidential personal identification number or a signature on a paper receipt.

A popular consumer payment option is telephone bill paying. These accounts are offered by financial institutions to retail customers to initiate regular periodic payments by use of a touch-tone telephone. Payment instructions are followed by the financial institution by charging the customer account and mailing a check to the designated payee. The payee cannot initiate the payment and cannot use telephone bill paying as a guaranteed method of payment at the time a product or service is sold.

An important new electronic payment method is the origination of charges by a supplier of goods or services through the Automated Clearinghouse (ACH) network. The supplier certifies to his financial institution that he has authorization from customers to originate charges to their bank accounts through the ACH system and provides the detailed account information to his financial institution to initiate the charges and to issue credit for them into the supplier's account. Financial institutions carefully restrict the use of the system to the most credit worthy suppliers (electronic collection of monthly insurance premiums by insurance companies is a typical example). While the supplier can receive credit immediately, there is no guarantee that the charges will not be returned unpaid and charged back to his account.

While other systems exist, the card and payment methods described above exemplify the overwhelming majority of non cash payments today. A draw back to most of the cards and card validation or control systems known in the art is that once a card is issued it is accepted by an extremely wide variety of businesses. As a result, commercial enterprises are reluctant to obtain credit cards and cards of other similar types for their employees due to the real possibility of abuse of the credit card by employees. Thus, there is a need in the art for a system for providing a restricted purpose commercial monetary regulation means which may be given to employees without fear of widespread unauthorized purchase of material that does not directly benefit the employee's company. It, therefore, is an object of this invention to provide an improved restricted purpose commercial regulation system that may be freely given to employees without fear of unauthorized purchase of material of no benefit to the company and that still provides guaranteed payment to the provider of a special good or service to the card holder.

Referring to the following diagram, further objects and advantages of this invention over the prior art are demonstrated in that it: (1) is available to any purchaser of a specified product or service, (2) is electronically authorized and captured at the point of sale, (3) provides immediate payment to the supplier or seller, (4) provides a detailed audit trail of all transactions, (5) limits the use of the payment method to a specific product or service provided by a specific supplier, (6) can be activated by telephone, and (7) provides guaranteed payment to the seller on acceptance. None of the cards or payment methods described above meet all of these requirements as summarized in the chart below. The column headed "New Method" represents the ability of the new invention to meet these requirements.

between the restricted purpose identification card user, a restricted purpose identification card acceptor, a restricted purpose identification card authenticator and a restricted purpose identification card manager. Once this network is established, the restricted purpose identification card user either presents the card to the card acceptor or transmits the card number to the card acceptor who validates the use of the card with the authenticator and, upon receiving validation, provides the card user with a single authorized product or service. Subsequently, processing, by the restricted purpose identification card manager, of authorized uses of the card takes place by means of transferring funds from the user's account, within the manager's control, to the acceptor's account. Each party, that is the user and the acceptor, is provided with collated information concerning the number of uses, quantities of funds transferred, time, date and place of use and remaining balances, among others. As a result, commercial card holders of the present invention are free to allow employees to use this restricted purpose card with the assurance that only the business of the company, limited to the single purpose product or service provided by the acceptor of the card, will be undertaken by the user. The invention provides a double restriction in that the employer not only selects the payee but also the product that can be purchased. Another embodiment of the invention enables a user to select more than one restricted payee or more than one product or service or both but while still maintaining the seven previously described advantages.

The need for and usefulness of the present invention can be further illustrated by way of example. Throughout the country, the movement of oversize/overweight motor vehicles on state highways is regulated by state departments of highway and public transportation by means of issuing permits and collecting fees for such movement. Issuance of these permits has traditionally been accomplished by direct purchase of permits by vehicle drivers at a large number of widely dispersed permit offices located in counties throughout the state. In most states, vehicle drivers must carry with them money orders, cashier checks, or cash for the exact amount of each permit. Unfortunately, entrusting driv-

| | PAYMENT OPTIONS | | | | | | | |
|---|---|---|---|---|---|---|---|---|
| REQUIREMENT | National Cr. Card | Dept. St. Cr. Card | Gasoline Cr. Card | Debit/ ATM | Tele. Bill Pay | Fleet Card | Originate ACH Debit | NEW METHOD |
| 1. Unrestricted Issue | No | No | No | Yes | Yes | No | No | YES |
| 2. Elec. Authorization/Capture | Yes | Yes | Yes | Yes | No | Yes | Yes | YES |
| 3. Immediate Payment | No | No | No | Yes | No | Yes | Yes | YES |
| 4. Audit Trail | Yes | Yes | Yes | Yes | Yes | Yes | Yes | YES |
| 5. Restricted Use and/or Payee | No | Yes | Yes | No | No | No | Yes | YES |
| 6. Telephone Activation | Yes | Yes | Yes | No | Yes | No | Yes | YES |
| 7. Merchant Guaranteed Pmt. Upon Acceptance | No | No | No | Yes | No | Yes | No | YES |

SHORT STATEMENT OF THE INVENTION

Accordingly, the restricted purpose, commercial monetary regulation system of the present invention includes preparing a restricted purpose identification card so that each card bears a unique identification means, such as a number. Next, a network is established ers with large amounts of money orders, cashier checks or cash is not an attractive proposition for companies and might also endanger the vehicle drivers. Substitution of a typical credit card in place of the money orders, cashier checks or cash does not solve the problem. Employees entrusted with credit cards may run up large amounts of bills for other than company related expenses or, if lost, unauthorized users could do the same in the period before the card is reported lost. On the other hand, utilization of the present invention of a restricted purpose, commercial monetary regulation system ensures that employees of businesses will only buy that for which the company has predetermined a need. The card of this invention eliminates the dangers and concerns associated with carrying large quantities of money orders, cashier checks or cash and eliminates the possibility of misuse associated with the ordinary credit card. Even if the restricted purpose commercial card is lost, it cannot be used to purchase any other item except that specifically associated with the card number. Additionally, companies are provided with a printed copy of every transaction in complete detail so that the user can determine when the card was used and for what limited purpose.

In the highway permit example, the card manager would also handle the transfer of funds accumulated as occuring, at the end of the day, or at some other regular period, to the card acceptor, that being the state department of highways and public transporation. As a result, states will receive their money more quickly, either immediately or as early as transactions are processed. This eliminates the need for a department to have a number of widely spaced permit offices throughout the state and prevents the hazards and delays associated with collecting large sums of money at such widely disbursed locations.

By way of further example, courthouses in every state require the payment of fees of various types in the course of litigation. As a result, lawyers are required to carry with them a check to cover the costs established by the courts. Unfortunately, states often change the fees and it is a common problem to arrive at the courthouse with a signed check for a given amount only to find that an additional amount is required. As a result, law firms, in much the same way as companies paying state permit fees, have a dilemma concerning equipping their employees to make proper payments. The solution of providing blank checks is obviously not preferred and most courthouses will not accept credit cards. As a result, the present invention could be utilized to eliminate waste, delay and risk associated with the present method of regulating monetary transactions at the courthouse. That is, an employee could be equipped with a restricted purpose commercial card that identifies the law firm's account to the clerk of the court. Once authenticated, the clerk can issue the employee a receipt for payment in full for whatever price currently is established for the filing of the particular document. The restricted purpose identification card manager would provide the user and acceptor of the card with an audit trail in the form of a printed statement indicating account transactions by date, time and place as well as amount. Court time lost in accounting for cash, checks and other items received in payment would be eliminated while, on the other hand, the law firm would be assured that the restricted purpose card utilized by their employee would only be utilized for the firm's benefit for the limited purpose of paying court fees.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
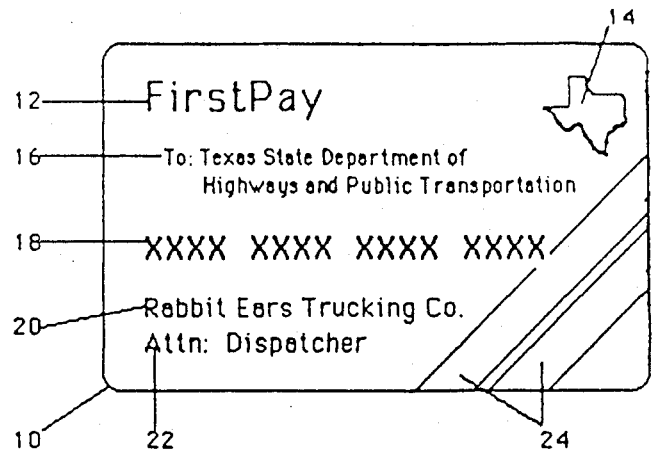
FIG. 1 is a front view of a preferred embodiment of the restricted purpose identification card of the present invention.

The preferred embodiment of the present invention is illustrated by way of example in FIGS. 1-4. With specific reference to FIG. 1, a front view of the restricted purpose commercial card 10 is shown with trademark identification 12, for example "FirstPay", and a silhouette of the State 14, of Texas in this example, indicating that the restricted purpose commercial card 10 is capable of being utilized within that particular state. The name of the limited purpose acceptor 16 is also shown on the card, in this instance the Texas State Department of Highways and Public Transportation. Next, a unique identification means 18 is provided. In this example, it is a sixteen digit number, fourteen of which comprise the number proper and two of which are authentication numbers derived from the application of any suitable arbitrary formula to the fourteen numbers proper. For example, the formula could be to add each individual number to the other and then divide the total of the fourteen numbers by two. The resulting two digit number would then be added, in an arbitrary and undisclosed place, to the list of the sixteen digit unique identification number 18 for an easy and accurate means of determining whether the unique identification number 18 is valid.

The next item listed on the front of restricted purpose commercial card 10 is the name of the restricted purpose identification card user 20, in this instance, "Rabbit Ears Trucking Company". Any other additional information 22, such as "Attention: dispatcher", and any other trademark identification 24, such as symbols for stripes, may be added to the front of restricted purpose commercial card 10.

Figure 2:
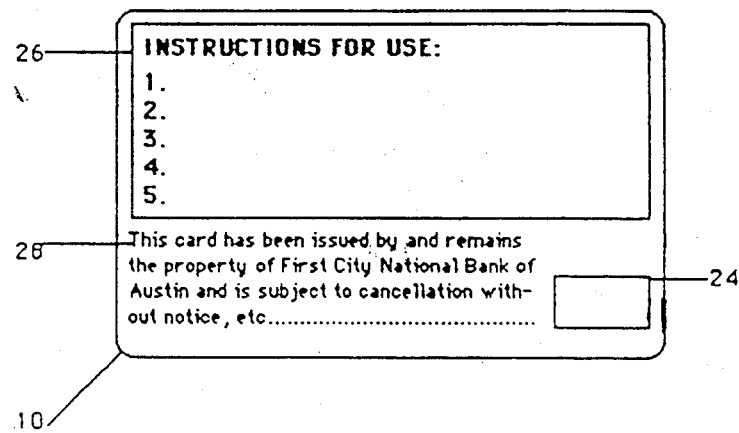
FIG. 2 is a back view of the card.

Referring now to FIG. 2, the back of restricted purpose commercial card 10 is illustrated. Any additional appropriate information may be displayed thereon as, for example, instructions for use 26, statement of rights and remedies 28 and any additional trademark information 24, such as a logo.

Figure 3:
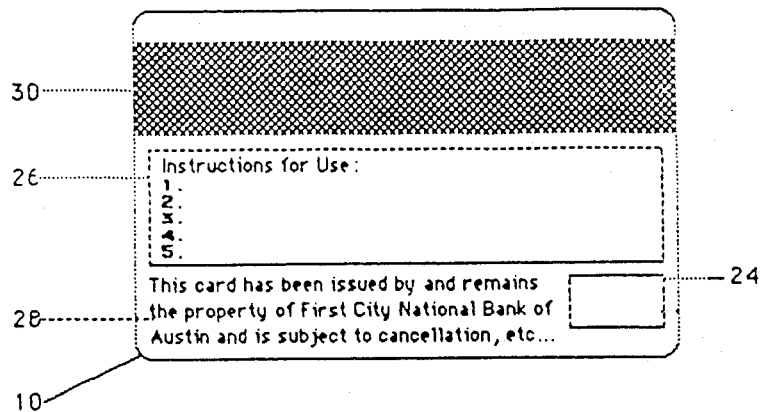
FIG. 3 is a back view of the embodiment of the card wherein a magnetic stripe is added.

Referring now to FIG. 3, restricted purpose commercial card 10 is shown in a back view wherein the embodiment of commercial card 10 is illustrated with the addition of a magnetic stripe 30. As is known in the art, the user's unique identification number 18, the total amount remaining in the user's account, the number of transactions previously executed, and any other various and sundry appropriate information may be electronically recorded as is known in the art.

Figure 4:
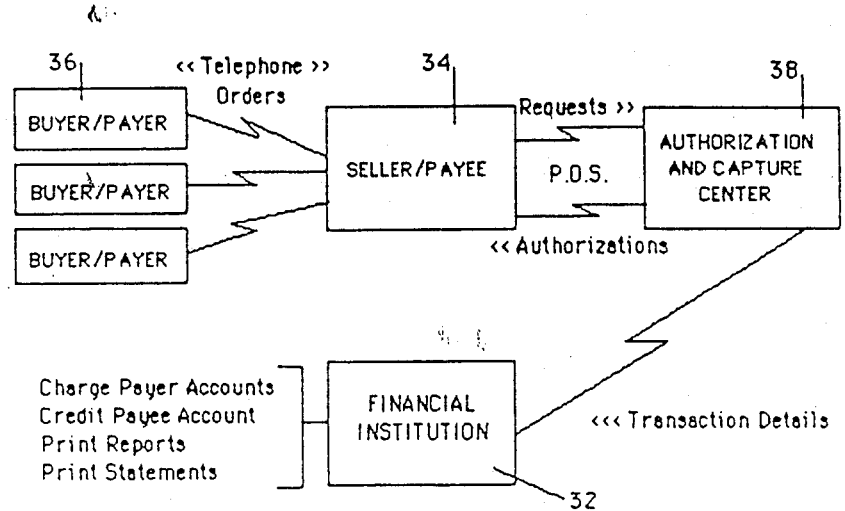
FIG. 4 is a schematic diagram illustrating the transaction flow of the restricted purpose commercial card of the present invention.

Referring to FIG. 4, a diagram reflecting the transaction flow of the present invention is illustrated. The restricted purpose commercial card monetary regulation system is established when a financial institution 32 establishes a network through agreement and contract with a payee 34 to accept payments for a specific product or service, based upon a unique identification number 18 issued and authorized by financial institution 32, by electronic authorization and capture of transactions through point of sale terminals. Additionally, networks are established between the financial institution 32 and restricted purpose commercial card user 36 to the effect that user 36 agrees to maintain a minimum balance with financial institution 32 and to allow financial institution 32 to automatically replenish user's account 36 when it reaches an arbitrary minimum value. Also illustrated in FIG. 4 is authorization and capture center 38 that has established an additional network with payee 34 and financial insitution 32 for the validating of restricted purpose commercial cards 10 by utilization of unique identification means 18 and the recording and transfer of information concerning the individual transaction.

Once a network has been established between the interested parties, the accounts have been properly established at financial institution 32 and restricted purpose commercial cards 10 have been issued to users 36, purchase transactions are conducted as follows. A user 36 orders a specific product or service by telephone call to payee 34 and provides unique identification number 18 to satisfy payment requirements. Payee 34 enters the amount of the purchase transaction and the unique identification number 18 provided by the payer, card user, 36 into an electronic point of sale terminal that communicates with authorization and capture center 38. An authorization and capture center 38 computer compares the unique identification number 18 to primary card information contained in a data base to determine if the unique identification number 18 provided is valid, if funds are available, and if, therefore, the transaction can be authorized. If the card number is invalid, an electronic response is sent to the point of sale terminal in the payee's 34 office that the transaction can not be processed and asks for another form of payment or a reentry of the number in the event an error was made in keying the number on the original attempt. If the card number is valid, an electronic response is sent to the point of sale terminal in the payee's 34 office approving the transaction and supplying a unique transaction number to be associated with the purchase records in the payee's 34 files.

Valid transactions are stored electronically (captured) at the authorization and capture center 38 until the end of the business day. Following the close of each business day, authorization and capture center 38 transmits captured transaction data to the data center of the card issuing financial institution 32 for processing. It may be that a more rapid transaction is required or desired. In that case, transactions may be either stored or captured as occuring during account balance verification.

Financial institution 32 charges each transaction to the account maintained at the financial institution by the payer/user 36 and credits the total of all daily transactions from all users 36 to the account maintained by payee 34. Detailed computer reports of all daily transactions are printed at the financial institution 32 for reconciliation of daily transactions and as an audit trial for payee 34. A statement is prepared monthly for each payer/user 36 account reflecting the details of each purchase transaction applied to the account during the month. Once user's 36 account reaches a pre-determined minimum amount, it is replenished by direct transfer from the user's 36 pre-selected account at that institution or at another institution.

It is obvious from this discussion that authorization and capture center 38 may be combined with financial institution 32 or remotely located. Additionally, it is obvious, as previously stated, that the transfer of funds from user's 36 account to payee's 34 account can occur on an as occuring basis as opposed to waiting until the end of the business day to complete that transaction.

From this detailed description it can be appreciated that the benefits of this method of monetary regulation are several. To begin with, any commercial entity becomes eligible to use the payment method by depositing funds in an account in an amount sufficient to cover expected monthly purchase volumes. Further, electronic authorization and capture is fast and reliable. The normal completion time for a transaction within this system is from eight to twelve seconds. Additionally, the payee will be paid the same business day. Automatic funds concentration will increase daily amounts of funds available for use by the payee through its cash management program as a side benefit. Additionally, a unique transaction serial number is assigned to each transaction for identification of the specific permit or product that was purchased with each transaction. Most importantly, payment can only be made to a designated payee. If the card of this invention or the unique identification number is lost or stolen, there is absolutely no risk that it will be misused to make general purchases. Of equal importance is the removal of the risk of lost or theft of money orders, cashier checks, cash or general purpose credit cards while in the possession of employees. Finally, consolidation of restricted purpose sales to a central office is capable under this system and would result in the elimination of superfluous offices located throughout the state thereby reducing operating costs significantly.

While the present invention has been disclosed in connection with the preferred embodiment thereof, it should be understood that there may be other embodiments which fall within the spirit and scope of the invention as defined by the following claims.

What is claimed is:

1. A restricted purpose, commercial, monetary regulation method comprising the steps of:
   a. preparing a restricted purpose identification card so that said restricted purpose identification card bears a unique identification means, such as a number;
   b. establishing a network between a restricted purpose identification card user, a restricted purpose identification card acceptor, a restricted purpose identification card authenticator and a restricted purpose identification card manager;
   c. utilizing said restricted purpose commercial card by transmitting said unique identification means to said acceptor who validates said use with said authenticator and, upon receiving validation, provides user with only a single authorized product or service; and
   d. processing, by said restricted purpose identification card manager, authorized utilizations of said restricted purpose identification card by transferring funds from a restricted purpose identification card user's account to said restricted purpose identification card acceptor and providing each transaction with a unique transaction number and each participant with collated information concerning number of uses, quantities of funds transferred, date, time and place of use, card number used and account balances.

2. A method according to claim 1, wherein said step of preparing a restricted purpose identification card includes utilization of a unique number wherein some digits of said numbers are the number proper and some digits are check numbers derived by application of an arbitrary formula to the number proper.

3. A method according to claim 2, wherein establishing said network includes said restricted purpose identification card user maintaining funds at an agreed level with said restricted purpose identification card manager and selecting a restricted purpose identification card acceptor from whom to purchase a good or service; said restricted purpose identification card acceptor agreeing with said restricted purpose identification card manager to accept said unique identification means from said restricted purpose identification card user after said restricted purpose identification card authenticator's determination of validity; and said restricted purpose identification card manager transfering funds from a restricted purpose identification card user's account to a restricted purpose identification card acceptor's account according to verified transaction amounts.

4. A method according to claim 3, wherein preparing a restricted purpose identification number includes encoding said unique sixteen digit number on a magnetic strip for automatic reading of said identification number through point of sale terminals.

5. A method according to claim 3, wherein said step of establishing a network includes combining said restricted purpose identification card authenticator and said restricted purpose identification card manager so that said network is reduced and simplified while maintaining the integrity of the regulation system.

6. A method according to claim 5, wherein said step of utilizing said restricted purpose commercial card by transmitting said unique identification means includes both remote transmission, as by telephone, and point of sale transmission through direct review of said restricted purpose identification card and unique identification means.

7. A method according to claim 6, wherein said step of processing authorized utilizations includes automatically maintaining said user's restricted purpose identification card account above a minimum level through direct transfer of said user's funds into said account and wherein said transferring of authorized funds from said restricted purpose identification card user's account to said restricted purpose identification card acceptor is done on a regularly timed basis, such as immediately after each said transaction and such as at the close of business each day.

8. A method according to claim 3, wherein said restricted purpose identification card user selects more than one restricted purpose identification card acceptor and more than one good or service for purchase.

* * * * *